United States Patent [19]

Ross

[11] Patent Number: 6,105,741

[45] Date of Patent: Aug. 22, 2000

[54] ELECTRIC DISTRIBUTION SYSTEMS AND ELECTRICAL TAKE-OFF APPARATUS THEREFOR

[75] Inventor: Steven L. Ross, Pittsburgh, Pa.

[73] Assignee: Universal Electric Corporation, Bridgeville, Pa.

[21] Appl. No.: 09/062,494

[22] Filed: Apr. 17, 1998

[51] Int. Cl.[7] .................................................. B60M 1/34
[52] U.S. Cl. ...................... 191/23 A; 191/23 R; 191/45; 191/48; 191/49
[58] Field of Search .................................. 191/6, 15, 45, 191/48, 49, 23 R, 23 A

[56] References Cited

U.S. PATENT DOCUMENTS

| | | |
|---|---|---|
| 3,337,697 | 8/1967 | Martin et al. .......................... 191/23 R |
| 3,877,553 | 4/1975 | Ross . |
| 5,449,056 | 9/1995 | Ross . |
| 5,503,259 | 4/1996 | Clopton et al. . |
| 5,688,132 | 11/1997 | Rogers et al. . |

OTHER PUBLICATIONS

*Chan–L–Wire Pro Series Lighting Systems*(Exhibit C), 2 pages.
Nordic Aluminum, Global Trac Pro—3–Circuit Lighting Track System (Exhibit D), 2 pages, copyright notices dated 1996 and 1997.
*Star Line Busway System*OFigure 1), 1 page.
*Star Line Busway System*(Exhibit E), 1 page.
*Track Systems*(Exhibit B), 2 pages.

*Primary Examiner*—S. Joseph Morano
*Assistant Examiner*—Robert J. McCarry, Jr.
*Attorney, Agent, or Firm*—Arnold B. Silverman; Eckert Seamans Cherin & Mellott, LLC

[57] ABSTRACT

An electric distribution system which includes an elongated generally channel-shaped busway having a top wall and a pair of side walls with bus bars secured to the interior of the side walls. An electrical take-off is slidably secured within the busway with the take-off having a housing, a pair of spaced rotatable electrical contact supports having a circuit selection portion for rotating the contact support. At least one electrical contact passing through a passageway in the support and a spring which surrounds a portion of the support adjacent the passageway, urging the electrical contact in a first direction. The contact support is structured to be rotated to a first position wherein the electrical contact is disposed within the take-off housing and a second position wherein it projects outwardly into contact with a bus bar. The spring, in a preferred form, is a spring clip which is positioned in surrounding relationship with a portion of the electrical contact support and urges an electrical contact, in the form of a pin having its head received within a recess adjacent to the spring into intimate contact with the bus bars. Electrical wires connect the electrical contact and emerge from the housing of the take-off to facilitate transfer of electric current from the bus bars to the desired location.

41 Claims, 5 Drawing Sheets

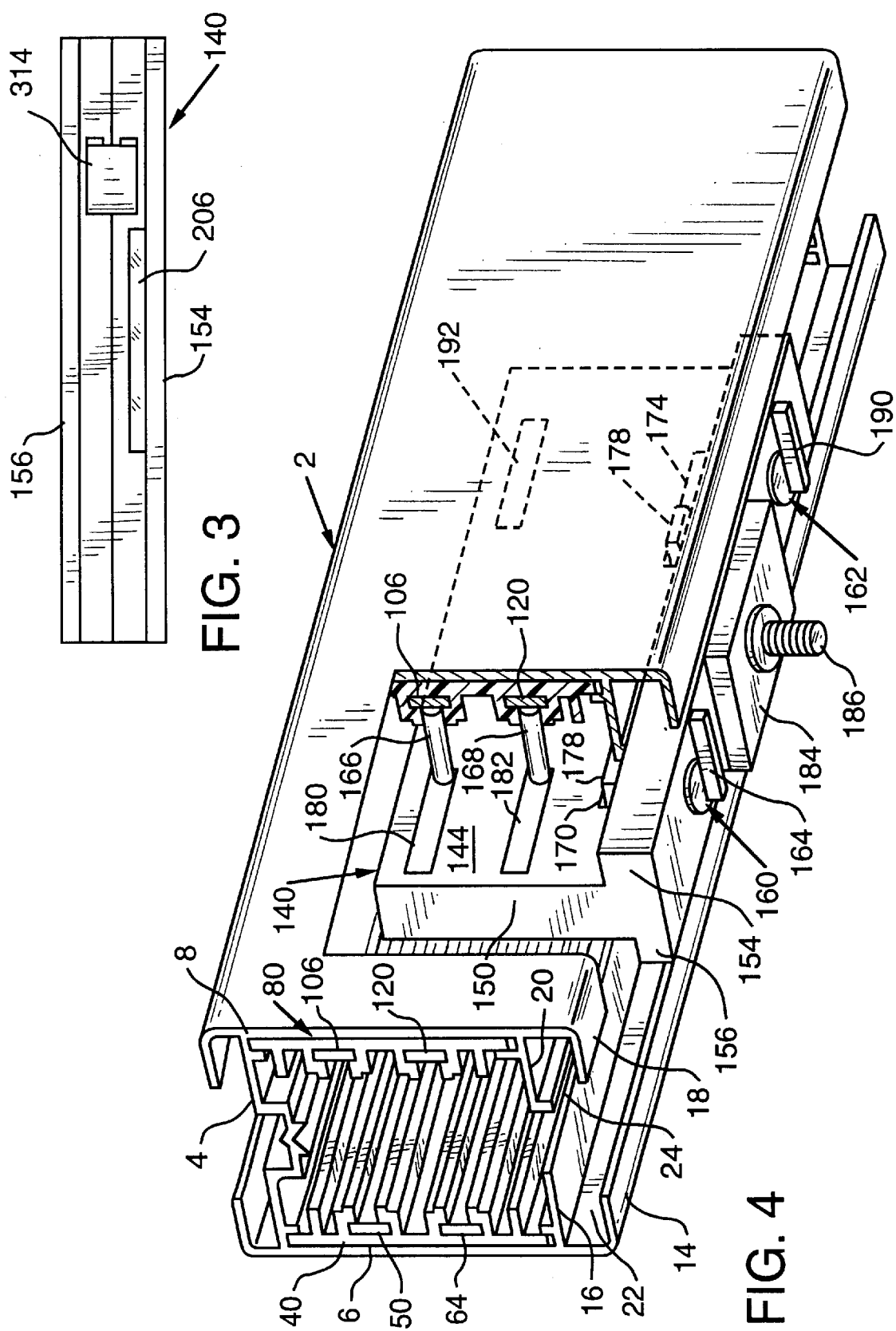

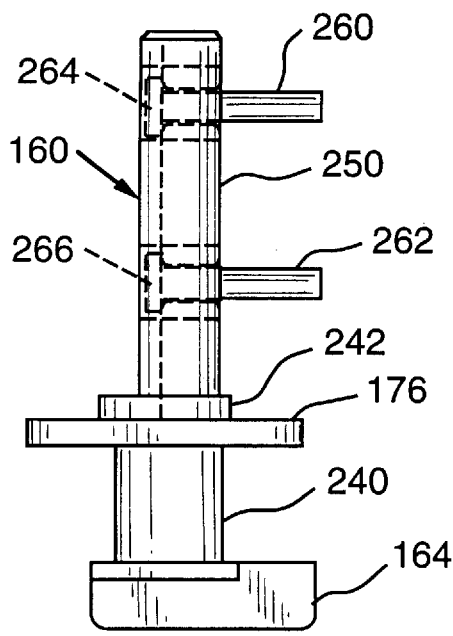
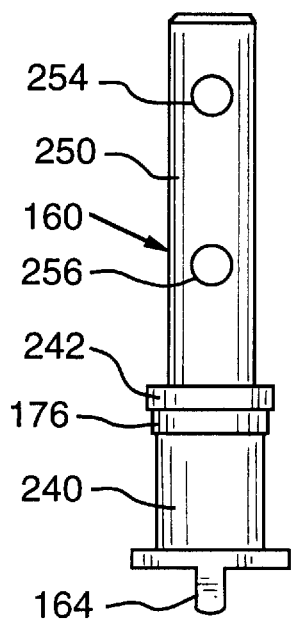
FIG. 7  FIG. 8
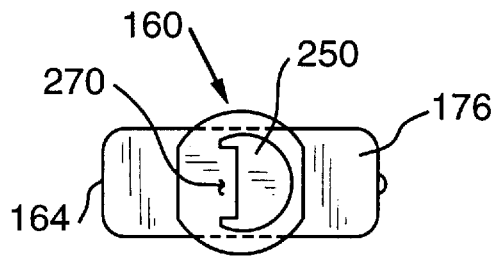
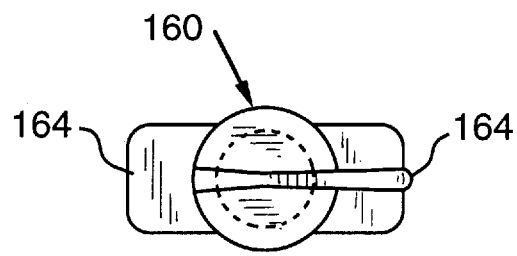
FIG. 9  FIG. 10
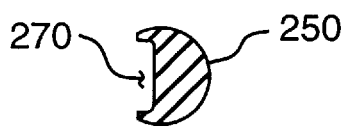
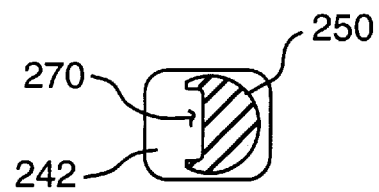
FIG. 11  FIG. 12

ELECTRIC DISTRIBUTION SYSTEMS AND ELECTRICAL TAKE-OFF APPARATUS THEREFOR

BACKGROUND OF THE INVENTION

1. Field of the Invention

The present invention relates to an electric distribution system which provides a unique electrical take-off wherein rotatable electrical contacts may be moved between a storage position and an active position wherein they are urged by spring clips into spring biased contact with the electrical bus bars.

2. Description of the Prior Art

It has been known to provide overhead busways containing bus bars for distributing electricity through various take-off devices to equipment, appliances, lighting and other articles requiring a source of electrical energy in order to operate. It has been known to provide busways having a top wall and side walls with electrical bus bars secured to the interior surfaces thereof for delivering electrical current to a take-off device. Means are provided for attaching and supporting such bus bars to structural supports and a suitable source of electrical energy. See, generally, U.S. Pat. No. 5,449,056 which is owned by the assignee of the present application.

It has been known to provide rotary take-off devices which have radially projecting rigid blades which are adapted to engage bus bars located in the busway track. One of the problems with such designs has been the extremely limited range of movement and, as a result, the lack of ability to accommodate variations in the size of the track in which the take-off device is installed. In addition, such devices are generally limited in current capacity to lamp loads typically in the range of about 3 to 5 amperes.

A product sold under the trade designation "Chan-L-Wire" provides a take-off device wherein sharp barbs puncture a soft electrically insulating cover on the bus bars in order to establish electrical contact. The barbs are not spring-loaded and rely on interference fit between the take-off device and the wires in the track. The take-off capacity of the system is said to be about 20 amperes.

It has also been suggested to employ a flat spring-tempered conductive material to facilitate electrical contact. See, generally, Global Track Pro by Nordic Aluminum. In this system a rotating cam urges a blade out of a housing. The blade engages a bus bar. The blade is inherently flexible and is said to exert a pressure on the bus bar. The system is believed to offer only about 5 amperes of current. Any effort to enlarge the blade would tend to reduce the ability of the blade to flex and also require more space.

It has also been known to employ a coil spring-loaded system wherein the electrical contact pin is urged toward the bus bar by a wound coil spring. A shortcoming of such a system is that the coil spring requires significant space to operate in both the extended and compressed state. See Starline Busway System B60 Busway Series. See, also, U.S. Pat. No. 3,877,553 and U.S. Pat. No. 5,503,259.

In spite of the prior art, there remains a substantial need for an electrical take-off system which will provide adequate take-off current, is of a reasonable size, adapts to variations in track sizes, and is reliable and easy to use.

SUMMARY OF THE INVENTION

The present invention has met the above-described need. The electrical take-off apparatus of the present invention is adapted to be used in combination with an elongated electrical distribution busway containing at least two bus bars. It has a housing, a pair of relatively spaced electrical contact supports, which are axially rotatable and disposed within the housing, and have a circuit selection portion for manual engagement in order to rotate the contact support. At least one elongated transverse passageway is formed within the contact support for receipt of an electrical contact. An elongated electrical contact passes through the passageway and spring means, which are in partial surrounding relationship with respect to the contact support, urge the electrical contact in a first direction. The spring means may take the form of a spring clip which extends around greater than 180 degrees and preferably greater than 270 degrees of the contact support.

The contact supports are adapted to be rotated between a first position wherein the electrical contact is disposed within the housing and one or two positions wherein the electrical contact or contacts project out of the housing is resiliently urged into intimate contact with a bus bar. Appropriate slots are provided within the housing to permit the degrees of rotational movement desired to effect positioning of the electrical contacts. One contact support is adapted to be rotated between a first position with the electrical contact within the housing and second positions in either rotary direction wherein the electrical contact projects from the housing. The other contact support may be rotated between a first position within the housing and a second position in one or two rotary directions which cause the electrical contact to project therefrom and engage a bus bar.

The electrical take-off is adapted to be slidingly received within a recess in a generally channel-shaped busway which has bus bars secured to the interior walls thereof. Rotation of the electrical contact support will cause the spring to urge the electrical contacts into intimate contact with the bus bars, thereby establishing efficient means for current flow. Electrical wires are operatively associated with the electrical contacts and extend out of the housing for connection to the desired device or appliance.

It is an object of the present invention to provide an electrical take-off which is adapted for use with standard overhead busways and may be readily inserted and removed.

It is another object of the present invention to provide such a take-off which will provide current at a level of up to about 25 amperes.

It is a further object of the present invention to provide such an electrical take-off and the associated busway wherein minimal space is occupied by the take-off device.

It is a further object of the present invention to provide such a take-off wherein effective electrical contact may be made with various sizes of electrical tracks.

These and other objects of the invention will be more fully understood from the following description of the invention on reference to the illustrations appended hereto.

BRIEF DESCRIPTION OF THE DRAWINGS

FIG. 3 is a top plan view of the take-off of FIG. 2.

FIG. 4 is a partially broken away perspective view showing a take-off of the present invention disposed within a busway.

FIGS. 7 and 8 are, respectively, front and side elevational views of an electrical contact support of the present invention with FIG. 7 showing electric contacts also.

FIG. 9 is a top plan view of a portion of a contact support of FIG. 8.

FIG. 10 is a bottom plan view of the contact support of FIG. 8.

FIG. 11 is a top plan view of a portion of the contact support of the present invention.

FIG. 12 is a top plan view of a contact support of the present invention.

DESCRIPTION OF THE PREFERRED EMBODIMENTS

Figure 1:
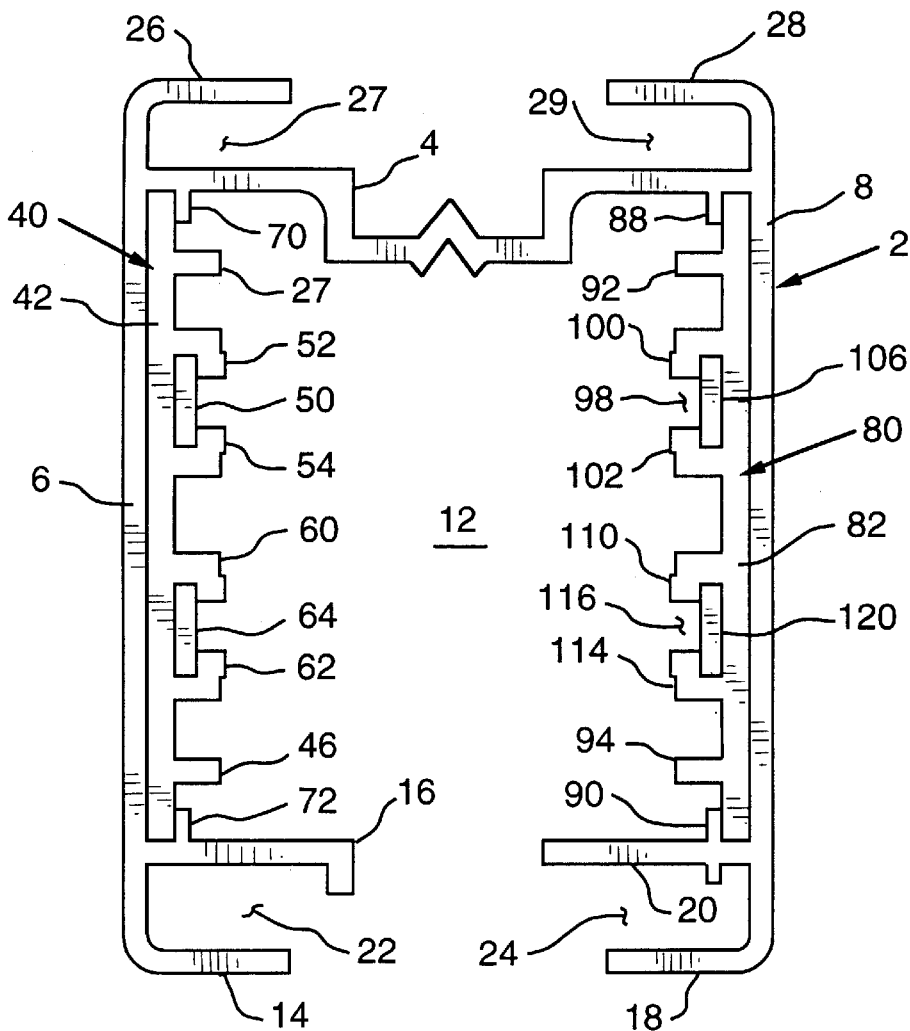
FIG. 1 is an end elevational view of a metal busway of the sort usable in the present invention.

Referring to FIG. 1, there is shown a busway 2 of the type previously known. The busway 2 has a generally channel-shape, which is the form most frequently employed, suspended from overhead and, therefore, is downwardly open. It may conveniently be formed as an aluminum extrusion, for example. It has a roof 4, a pair of side walls 6, 8, and defines a downwardly open recess 12. Two pairs of spaced flanges 14, 16 and 18, 20 define, respectively, generally inwardly open recesses 22, 24, which will receive portions of the electrical take-off of the present invention. Upper inwardly projecting flanges 26, 28 cooperate with roof member 4 to define recesses 27, 29, respectively, which may receive components employed to suspend the busway.

In order to provide bus bars within the busway 2, there must be electrical insulation provided between the bus bars and the rest of the metal busway 2 in order to avoid undesired energization of the entire busway.

As shown, an insert 40, which is preferably composed of a electrically insulating material, such as a resinous plastic extrusion, has a base wall 42 which is slidingly received under walls 70, 72, has a pair of projecting walls 44, 46, and has two pairs of channels defined by walls with thickened free ends 52, 54 and 60, 62. These receive and retain, respectively, electrically conductive elongated bus bars 50, 64. In general, the busway will have a substantially uniform cross-sectional configuration throughout its longitudinal extent, except where access openings or fasteners may be secured to the same.

Similarly, electrically insulating insert 80 has a base 82, is secured under walls 88, 90, and has a pair of inwardly projecting walls 92, 94. A first channel 98 is defined between walls 100, 102, which have thickened free ends, and receives and retains bus bar 106. Walls 110, 114 define a recess 116 which receives and retains electrically conductive bus bar 120.

Bus bar 50 is preferably aligned with bus bar 106 and is generally parallel thereto. Bus bar 64 is generally aligned with bus bar 120 and is generally parallel thereto. In general, the bus bars 50, 64, 106, 120 will be substantially coextensive with the busway 2 and electrically isolated from each other. A source of electrical energy is provided to the bus bars 50, 64, 106, 120 by any conventional means well known to those skilled in the art.

Referring to FIGS. 2–6, details regarding the electrical take-off apparatus of the present invention and the manner in which it provides electrical continuity between the bus bars 50, 64, 106, 120 and whatever electrically energized device or system receives electrical energy from the take-off will be considered. The take-off 140 has a housing 144, which is substantially hollow, and may be composed of a resinous plastic material. In the illustrated embodiment, it has a generally inverted T-shape as shown by end wall 150 in FIG. 4. The enlarged base has a first generally horizontally projecting portion 154 and a second generally horizontally projecting portion 156 with the former having greater height than the latter. These portions are received, respectively, within recesses 24 and 22 (FIG. 1) in a sliding manner. The take-off 140 is inserted into the busway 2 at the longitudinal location where electrical energy is desired is reached.

In a manner which will be described in greater detail hereinafter, a pair of electrical contact supports 160, 162 (FIG. 5) are axially rotatably mounted within the housing 144 and are relatively spaced from each other with their longitudinal axes generally parallel. At the lower ends of the contact supports 160, 162, respectively, are circuit selectors 164, 190 rotation of which will cause the electrical contact or contacts to be rotated into a first position concealed within the housing 144 or a second position projecting outwardly from the housing into contact with the bus bars 106, 120 (FIG. 4). In the position shown in FIG. 4, the rigid electrical contacts 166, 168, which may be copper pins, are shown in their projecting or second positions being urged into intimate contact with bus bars 106, 120. In general, only one electrical contact 166 or 168 could be employed on an electrical contact support 160 at one time. It will be understood that electric contacts 166, 168 are alternate positions which are shown and described herein as being present at each location for completeness of disclosure. In the preferred approach, electric contact 166 or electrical contact 168, but not both, would be employed. The electrical contacts 166, 168 project, respectively, through elongated slots 180, 182 in housing 144. In moving the electrical contacts 166, 168 to the first position within the housing 144, circuit selector 164 would be rotated in a clockwise direction, thereby rotating the electrical contacts 166, 168 until they pass through slots 180, 182 and into the housing 144. Circuit selector 190 is similarly rotated to create corresponding rotation of contact support 162 and have the electrical contact, which serves as the neutral selector in 3 phase systems (not shown in this view), rotate through elongated slot 192 which is shown in phantom. In the form shown, corresponding slots 320 and 322 (FIG. 6) are provided on the opposite side of the housing 144 so that electrical contacts 166, 168 may project out of the opposite side of the housing. Also shown in FIG. 6 is a slot 328 corresponding to slot 192, but permitting the circuit selector 190 to cause its electrical contact to project from the other side of housing 144. It will be appreciated that the number of electric contacts on an electrical contact support and the corresponding associated slots being in only one housing wall or both is a matter of design preference dependent on the requirement of a particular installation.

Plate 184 and associated bolt 186 shown in FIG. 4 may be employed to support an underlying lighting fixture where such an application is involved.

Figure 2:
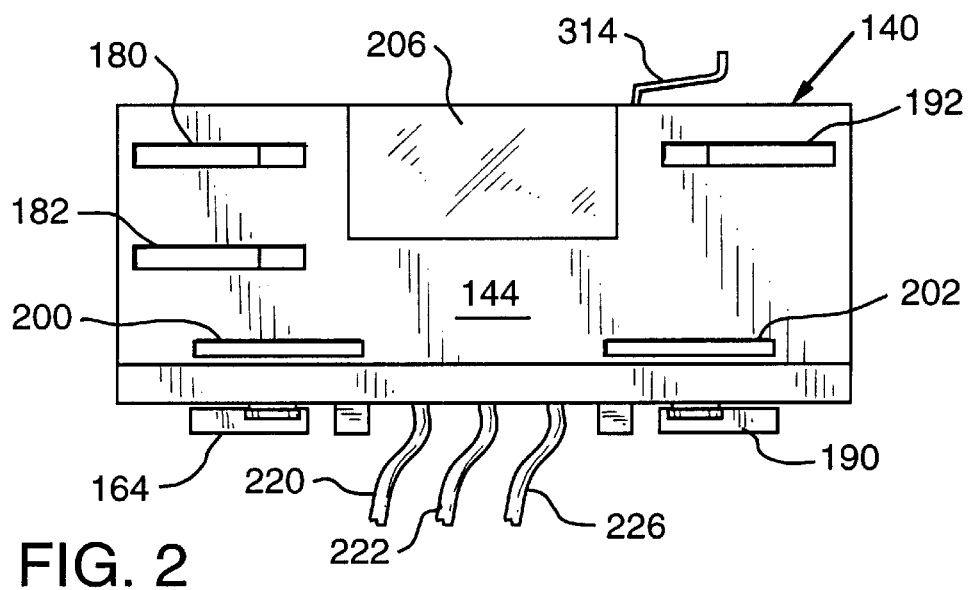
FIG. 2 is a side elevational view of a form of take-off of the present invention.
Figure 5:
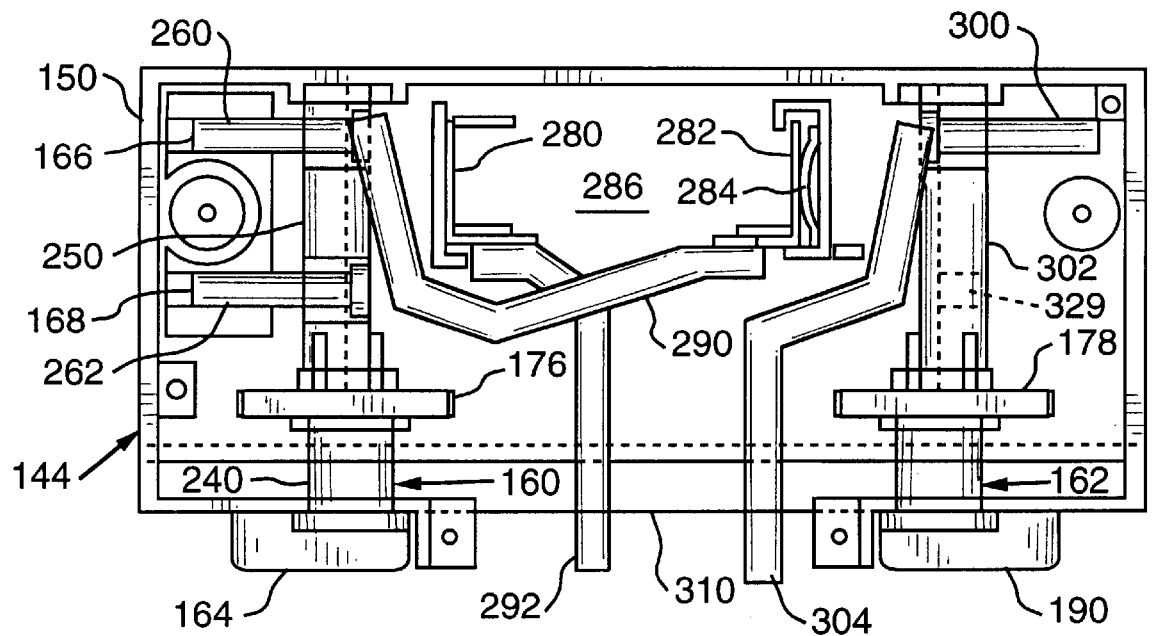
FIG. 5 is a cross-sectional elevational view of a form of take-off of the present invention.
Figure 6:
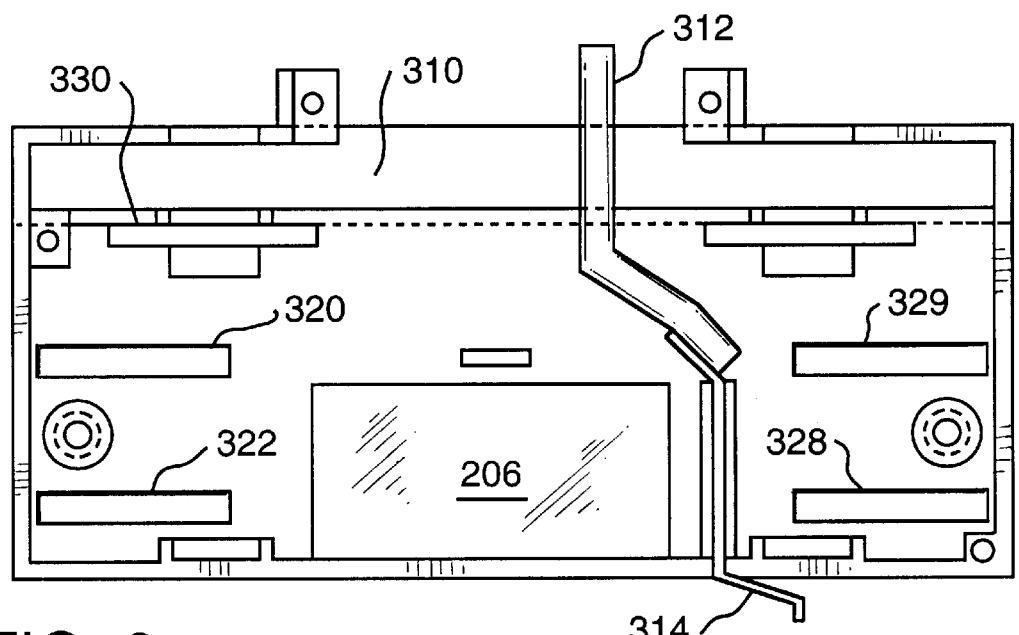
FIG. 6 is a partially in section inverted elevational view of a take-off of the present invention.

Referring in greater detail to FIGS. 2, 3 and 5 in addition to the slots 180, 182, a lower slot 200, which is adapted to receive a projecting fin 176 which may be integrally formed on contact support 160, is provided. This projecting fin 176 serves to facilitate efficient rotation of the contact supports 160, 162 and resultant electric contact positioning.

A similar slot 202 which cooperates with fin 178 is provided in underlying spaced relationship with respect to slot 192. A fuse box 206, which will be described in greater detail, is provided within the housing 144. Electrical wires 220, 222 and 226 are shown extending downwardly out of housing 144 for connection to the electrical device which is to be energized. A ground clip 314 projects upwardly from the housing 144.

Referring in greater detail to FIGS. 5–10, the electrical contact support 160 will be considered in greater detail. Contact support 162 may be of substantially identical construction. The electrical contact support 160 has the circuit selector 164 located at the base, an enlarged lower cylindrical portion 240, a blade 176, an overlying transition portion 242 and a generally cylindrical upper portion 250. A pair of transversely oriented passageways 254, 256 (FIG. 8) extend completely through the upper portion 250. As shown in FIGS. 5 and 7, each passageway 254, 256 receives, respectively, an elongated electrical contact member 260, 262 which, in the form shown, are metal pins having heads 264, 266, respectively, It will be appreciated that the passageways 252, 256 are of such diameter that the shank portion of the electrical contact passes therethrough, but the pins 264, 266 will not. As a result, a force urging the pin 260, 262 in the direction of the free end of the shank will cause movement to be limited by the pin heads 264, 266. As shown in FIGS. 11 and 12, the upper portion 250 has a recess 270 which receives the heads of the pins 260, 262.

The contact support 160 is preferably molded of a resinous plastic material or other suitable electrically non-conductive material as a unit such that rotation of the circuit selector 164 will effect rotation of the electrical contact support as a unit and will serve to effect rotation of the electrical contact elements 260, 262. The electrical contacts 260, 262 are preferably made of a suitable electrically conductive material, such as copper or aluminum, are preferably substantially rigid and are electrically rated to carry 20 amperes or more. In the form shown in FIG. 5, the electrical contact support is in a first position wherein the contacts 260, 262 are disposed within the housing 144 and generally aligned with the longitudinal extent of housing 144. Rotation of channel selector 164 in either direction will effect rotation of the electrical contacts 260, 162 causing them to project through the slots in either side of the housing 144.

In the form illustrated, the take-off has a fuse box which is indicated generally by the reference 206 in FIG. 3 and 6. As shown in FIG. 5, a pair of spaced fused terminals 280, 282 are present with a fuse leaf spring 284 urging terminal 282 inwardly. In use, a fuse would be placed in recess 286. Wire 290, which is electrically connected to contact 260 is connected to fuse contact 286. If electrical contact 262 and not electrical contact 260 were employed, wire 290 would be connected to electrical contact 262. Wire 292 is connected to fuse contact 280.

Referring still to FIGS. 5 and 6, the ground or neutral selector portion of the take-off will be considered. The electrical contact support 162 is rotatable by rotation of neutral selector 190. In the form shown, a single electrical conductor element 300 is received within a passageway in the upper portion 302 and is secured for rotation therewith. The conductor 300 may be substantially identical to the conductor pins 166 and 168. Wires 292 and 304 extend outwardly through an opening 310 in the take-off. As shown in FIG. 6, wire 312 which is electrically connected to ground tab 314 also extends outward through opening 310. The ground tab 314 is normally a metal leaf spring which is in contact with the undersurface of roof 314 in the central region thereof.

In using the take-off, it will be positioned in the desired longitudinal location of the busway 2 and the wires 292, 310, 312 will be secured to the lighting fixture, piece of equipment or other electrically energized device which is to be energized through appropriate switch means (not shown).

FIG. 6 also shows the pair of slots 320, 322 through which conductive pins 166, 168 will pass in the event that the circuit selector 164 is rotated in the opposite direction from that of pins 166, 168 shown in FIG. 4. Also, slot 324 is provided for the blade element 176. Similarly, slots 328 and 330 are for receipt of the conductor 300 and the blade 178, respectively, in the event rotation is effected in the opposite direction.

While single slots 192 (FIG. 4) and 328 have been illustrated as being employed in association with contact support 162, if an electrical contact were placed in passageway 329, additional slots (not shown) on one or both sides of the housing could be employed to provide a pair of slots on one or both sides of the housing cooperating with electrical contact support 162.

Figure 13:
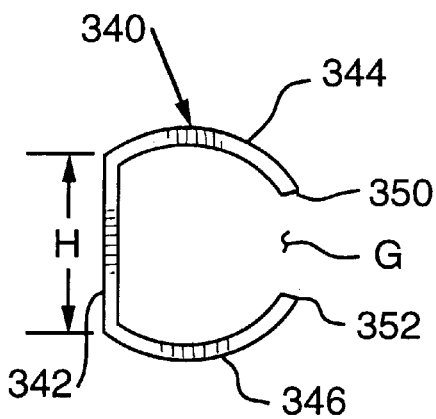
FIG. 13 is a top plan view of a spring clip usable in the present invention.
Figure 14:
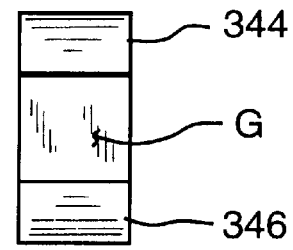
FIG. 14 is a right-side elevational view of the clip of FIG. 13.
Figure 15:
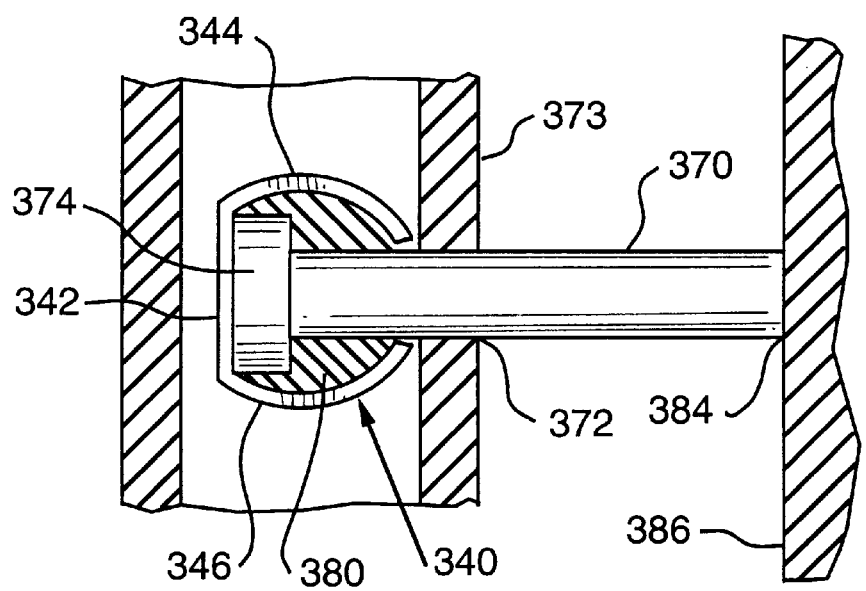
FIG. 15 is a top plan view showing the spring of FIG. 13 in engagement with a portion of the contact support and the associated electrical contact.

Referring to FIGS. 13 through 15, an important feature of the present invention will be considered. As stated in connection with the discussion of FIG. 7, the heads 264, 266 of conductors 260, 262 resist movement of the conductors in a first direction, i.e., to the right in FIG. 7. A spring member 340, which preferably is made of metal and is structured to have a generally flat base 342 with a pair of projecting resilient arms 344, 346, which have free ends 350, 352 and leave a gap G therebetween, is employed to urge the electrical contacts 260, 262, 300 into intimate contact with the bus bars 50, 64, 106, 120 (FIG. 1). As shown in FIG. 15, an electrical contact 370 passes through a slot 372 in housing wall 373 and has its head portion 374 in engagement with base 342 of spring 340.

The spring surrounds an axial extent of upper portion 380 of a electrical contact support generally in the region of pin head 374. The upper portion 380 is preferably substantially circular in cross-section except for the recess which receives pin head 374 and the passageway 372 through which the shank of electrical contact 370 passes. Counting the base 342, the spring 340 will cover at least a portion of the circumference of the upper portion 380 greater than 180 degrees and preferably greater than 270 degrees. Any effort to urge the electrical contact 370 axially to the left as shown in FIG. 15 will be met by resistance of the spring 340 which through its arms 344, 346 is anchored against the exterior surface of the upper portion 380. Resistance to movement of the contact 370 in a second direction, i.e., to the left in FIG. 15 will, therefore, be provided by the spring 340. When the free end 384 of electrical contact 370 contacts the bus bar 386, it will be urged into intimate contact therewith under the influence of spring 340.

By way of example, the spring 340 may be made of a suitable steel having a thickness of about 0.008 inch. In a preferred embodiment, the spring may have a base 342 of a height H as shown in FIG. 13 of about 0.3 to 0.4 inch.

It will be appreciated, therefore, that the present invention has provided an effective electrical take-off for use with a conventional busway such that intimate electrical contact between one or more electrically conductive contacts and the bus bars is achieved in a reliable, efficient manner. This is accomplished while being compatible with existing busways and occupying a minimum of space and still having the advantages of the influence of spring action. All of this is accomplished in a safe, economical manner which is compatible with existing busway systems and the needs of the end user in respect of a large variety of electrically energized devices.

The use of directional terms, such as "upward," "downward," "inner" and variations thereof are for purposes of ease disclosure and shall be deemed to be limitations on the invention unless in a particular use there is an express indication to the contrary.

Whereas particular embodiments of the invention have been described above for purposes of illustration, it will be evident to those skilled in the art that numerous variation of the details may be made without departing from the invention as defined in the appended claims.

What is claimed is:

1. Electrical take-off apparatus for use with an elongated electrical distribution busway containing at least two bus bars comprising
   a housing,
   a pair of relatively spaced electrical contact supports rotatably mounted within said housing and having circuit selection members for rotating said contact supports in said housing,
   at least one electrical contact receiving passageway formed within said electrical contact supports,
   an elongated electrical contact passing through a said passageway in each said contact support, and
   spring means resisting movement of said electrical contact out of said passageway in one direction.

2. The electrical take-off apparatus of claim 1 including said electrical contact being substantially rigid.

3. The electrical take-off apparatus of claim 2 including said electrical contacts being pins having an enlarged head of greater diameter than said passageway through which said pin passes, whereby said pin head will resist removal of said pin from said passageway in a direction which is generally opposite to said one direction.

4. The electrical take-off apparatus of claim 3 including said spring means extends at least 180 degrees around said contact support.

5. The electrical take-off apparatus of claim 4 including said spring means being springs having a strip of metal which extends at least 270 degrees around said contact supports.

6. The electrical take-off apparatus of claim 5 including said contact supports having a pin head receiving recess and said pin heads being received therein.

7. The electrical take-off apparatus of claim 6 including the portion of each said contact support disposed adjacent said spring having a generally circular cross-sectional configuration except for said pin head recess and said passageway.

8. The electrical take-off apparatus of claim 1 including said electrical contact support being rotatable between a first position wherein said electrical contact is disposed within said housing and a second position wherein said electrical contact projects therefrom into contact with a bus bar.

9. The electrical take-off apparatus of claim 8 including at least one said electric contact support being rotatable from said first position in either direction to cause said electrical contact to project from said housing in either direction.

10. The electrical take-off apparatus of claim 9 including a second said electric contact support being rotatable in only one direction to effect projection of said electrical contact in said second position.

11. The electrical take-off apparatus of claim 8 including said electrical contact in said second position being generally perpendicular to the axial extent of said electrical contact when it is in said first position.

12. The electrical take-off apparatus of claim 1 including electrical wires electrically connected to said electrical contacts.

13. The electrical take-off apparatus of claim 12 including fuse means disposed within said housing and being operatively associated with said electrical wires.

14. The electrical take-off apparatus of claim 8 including said spring means being structured to urge said electrical contact into intimate contact with said bus bar.

15. The electrical take-off apparatus of claim 1 including slots in said housing to permit passage of said electrical contacts therethrough.

16. The electrical take-off apparatus of claim 1 including each said electrical contact support having one electrical contact secured thereto.

17. The electrical take-off apparatus of claim 4 including said spring being a spring clip having a base adjacent to said pin head and a pair of curved arms extending from the ends of said base along the circumference of said contact support.

18. The electrical take-off apparatus of claim 17 including said base being substantially flat.

19. The electrical take-off apparatus of claim 18 including said spring clip arms having free ends adjacent the shank of said pin.

20. The electrical take-off apparatus of claim 9 including both said electric contact supports being rotatable in either said direction to effect said electrical contact projection in either direction.

21. An electric distribution system comprising
   an elongated generally channel-shaped member having an upper wall and a pair of depending generally parallel side walls,
   at least one electrical bus bar mounted on the interior of each said side wall,
   electrical take-off apparatus being slidably received within the passageway of said elongated channel having a housing,
   a pair of relatively spaced electrical contact supports rotatably mounted within said housing and having circuit selection members for rotating said contact supports in said housing,
   at least one electrical contact receiving passageway formed within each said electrical contact support,
   an elongated electrical contact passing through a said passageway in each said contact support, and
   spring means resisting movement of said electrical contact out of said passageway in one direction and urging said electrical contact into contact with a said bus bar, whereby electrical continuity is established between said busway and said electrical take-off.

22. The electric distribution system of claim 21 including said electrical contact being substantially rigid.

23. The electric distribution system of claim 22 including said electrical contacts being pins having an enlarged head of greater diameter than said passageway through which said pins pass, whereby said pin head will resist removal of said pin from said passageway in a direction which is generally opposite to said one direction.

24. The electric distribution system of claim 23 including said spring means extends at least 180 degrees around said contact support.

25. The electric distribution system of claim 24 including said spring means being springs having a strip of metal which extends at least 270 degrees around said contact support.

26. The electric distribution system of claim 25 including said contact supports having a pin head receiving recess and said pin heads being received therein.

27. The electric distribution system of claim 26 including the portion of said contact supports disposed adjacent said springs having a generally circular cross-sectional configuration except for said pin head recess and said passageway.

28. The electric distribution system of claim 21 including said electrical contact support being rotatable between a first position wherein said electrical contact is disposed within said housing and a second position wherein said electrical contact projects therefrom into contact with a bus bar.

29. The electric distribution system of claim 28 including a first said contact support being rotatable from said first position in either direction to cause said electrical contact to project from said housing in either direction.

30. The electric distribution system of claim 29 including a second said contact support being rotatable in either direction to effect projection of said electrical contact in either position.

31. The electric distribution system of claim 28 including said electrical contact in said second position being generally perpendicular to the axial extent of said electrical contact when it is in said first position.

32. The electric distribution system of claim 21 including electrical wires electrically connected to said electrical contacts.

33. The electric distribution system of claim 32 including fuse means disposed within said housing and being operatively associated with said electrical wires.

34. The electric distribution system of claim 28 including said spring means being structured to urge said electrical contact into intimate contact with said bus bar.

35. The electric distribution system of claim 21 including slots formed in said housing to permit passage of said electrical contacts therethrough.

36. The electric distribution system of claim 21 including each said electrical contact support having one electrical contact secured thereto.

37. The electric distribution system of claim 21 including said busway having a pair of generally parallel electrical bus bars disposed in electrically insulated recesses on opposite sides of said busway.

38. The electric distribution system of claim 37 including said busway having a lower portion terminating with re-entrant flanges which cooperate to support said take-off.

39. The electrical take-off apparatus of claim 21 including said spring means being a spring clip having a base adjacent to said pin head and a pair of curved arms extending from the ends of said base along the circumference of said contact support.

40. The electrical take-off apparatus of claim 39 including said base being substantially flat.

41. The electrical take-off apparatus of claim 39 including said spring clip arms having free ends adjacent the shank of said pin.

* * * * *

UNITED STATES PATENT AND TRADEMARK OFFICE
CERTIFICATE OF CORRECTION

PATENT NO. : 6,105,741
DATED : August 22, 2000
INVENTOR(S) : Steven L. Ross

It is certified that error appears in the above-identified patent and that said Letters Patent is hereby corrected as shown below:

<u>Title page,</u>
Item [56], References Cited, under OTHER PUBLICATIONS, after "*Star Line Busway System*" "O" should be a -- ( (opening parenthesis) --.
After "*Star Line Busway System*" insert a space prior to the opening parenthesis.
After "*Track Systems*" insert a space prior to the opening parenthesis.

Signed and Sealed this

Second Day of July, 2002

*Attest:*

JAMES E. ROGAN
*Attesting Officer*   *Director of the United States Patent and Trademark Office*